United States Patent
Pong

(10) Patent No.: US 8,427,945 B2
(45) Date of Patent: *Apr. 23, 2013

(54) SOC DEVICE WITH INTEGRATED SUPPORTS FOR ETHERNET, TCP, ISCSI, RDMA AND NETWORK APPLICATION ACCELERATION

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/569,360

(22) Filed: Sep. 29, 2009

(65) Prior Publication Data

US 2010/0030910 A1    Feb. 4, 2010

Related U.S. Application Data

(63) Continuation of application No. 11/228,363, filed on Sep. 16, 2005, now Pat. No. 7,596,144.

(60) Provisional application No. 60/688,265, filed on Jun. 7, 2005.

(51) Int. Cl.
*H04L 12/28* (2006.01)
*G06F 15/16* (2006.01)

(52) U.S. Cl.
USPC .......... 370/230; 370/255; 370/392; 709/232; 709/250

(58) Field of Classification Search .......... 370/230–351, 370/389–400, 464–469; 709/250–252, 216–232
See application file for complete search history.

(56) References Cited

U.S. PATENT DOCUMENTS

| | | | | |
|---|---|---|---|---|
| 5,905,873 | A  * | 5/1999  | Hartmann et al. | 709/249 |
| 6,775,719 | B1   | 8/2004  | Leitner et al. | |
| 6,996,070 | B2 * | 2/2006  | Starr et al. | 370/252 |
| 7,107,359 | B1 * | 9/2006  | Burton et al. | 709/250 |
| 7,356,633 | B2 * | 4/2008  | Weber et al. | 710/306 |
| 7,412,588 | B2   | 8/2008  | Georgiou et al. | |
| 7,580,406 | B2 * | 8/2009  | Shah et al. | 370/389 |
| 7,761,608 | B2 * | 7/2010  | Rohde et al. | 709/250 |
| 2004/0093411 | A1 * | 5/2004 | Elzur et al. | 709/224 |
| 2004/0128341 | A1 * | 7/2004 | Synek et al. | 709/200 |
| 2005/0021874 | A1   | 1/2005 | Georgiou et al. | |
| 2006/0034283 | A1 * | 2/2006 | Ko et al. | 370/392 |
| 2006/0182101 | A1   | 8/2006 | Hoekstra et al. | |
| 2006/0209724 | A1 * | 9/2006 | Arndt et al. | 370/255 |
| 2006/0230119 | A1 * | 10/2006 | Hausauer et al. | 709/216 |

FOREIGN PATENT DOCUMENTS

WO    WO 2005013143 A1    2/2005

* cited by examiner

*Primary Examiner* — Man Phan
(74) *Attorney, Agent, or Firm* — Thomas | Horstemeyer, LLP

(57) ABSTRACT

A method for processing data is disclosed and may include performing by one or more processors and/or circuits on a chip that handles a plurality of networking protocols, receiving data for one or more network connections corresponding to one or more of the plurality of networking protocols. The chip may be configured for handling the received data based on whether the one or more of the plurality of networking protocols associated with the received data includes transmission control protocol and/or remote direct memory access protocol. The received data may be processed based on the configuration. At least one RDMA marker may be removed from the received data when the received data includes the RDMA protocol, and/or the received data is processed based on a transmission control protocol session identification within the received data.

33 Claims, 7 Drawing Sheets

SOC DEVICE WITH INTEGRATED SUPPORTS FOR ETHERNET, TCP, ISCSI, RDMA AND NETWORK APPLICATION ACCELERATION

CROSS-REFERENCE TO RELATED APPLICATIONS/INCORPORATION BY REFERENCE

This application makes reference to, claims priority to, and claims benefit of U.S. patent application Ser. No. 11/228,363 filed Sep. 16, 2005, which is now U.S. Pat. No. 7,596,144. This application also makes reference to, claims priority to, and claims benefit of U.S. Provisional Application Ser. No. 60/688,265 filed Jun. 7, 2005.

This application also makes reference to:
U.S. patent application Ser. No. 11/228,836 filed Sep. 16, 2005;
U.S. patent application Ser. No. 11/228,060 filed Sep. 16, 2005;
U.S. patent application Ser. No. 11/228,398 filed Sep. 16, 2005;
U.S. patent application Ser. No. 11/228,163 filed Sep. 16, 2005;
U.S. patent application Ser. No. 11/228,059 filed Sep. 16, 2005; and
U.S. patent application Ser. No. 11/228,362 filed Sep. 16, 2005.

Each of the above stated applications is hereby incorporated herein by reference in its entirety.

FIELD OF THE INVENTION

Certain embodiments of the invention relate to processing of network data. More specifically, certain embodiments of the invention relate to a method and system for a system-on-a-chip (SoC) device with integrated support for Ethernet, TCP, iSCSI, RDMA, and network application acceleration.

BACKGROUND OF THE INVENTION

The International Standards Organization (ISO) has established the Open Systems Interconnection (OSI) Reference Model. The OSI Reference Model provides a network design framework allowing equipment from different vendors to be able to communicate. More specifically, the OSI Reference Model organizes the communication process into seven separate and distinct, interrelated categories in a layered sequence. Layer 1 is the Physical Layer. It deals with the physical means of sending data. Layer 2 is the Data Link Layer. It is associated with procedures and protocols for operating the communications lines, including the detection and correction of message errors. Layer 3 is the Network Layer. It determines how data is transferred between computers. Layer 4 is the Transport Layer. It defines the rules for information exchange and manages end-to-end delivery of information within and between networks, including error recovery and flow control. Layer 5 is the Session Layer. It deals with dialog management and controlling the use of the basic communications facility provided by Layer 4. Layer 6 is the Presentation Layer. It is associated with data formatting, code conversion and compression and decompression. Layer 7 is the Applications Layer. It addresses functions associated with particular applications services, such as file transfer, remote file access and virtual terminals.

Various electronic devices, for example, computers, wireless communication equipment, and personal digital assistants, may access various networks in order to communicate with each other. For example, transmission control protocol/internet protocol (TCP/IP) may be used by these devices to facilitate communication over the Internet. TCP enables two applications to establish a connection and exchange streams of data. TCP guarantees delivery of data and also guarantees that packets will be delivered in order to the layers above TCP. Compared to protocols such as UDP, TCP may be utilized to deliver data packets to a final destination in the same order in which they were sent, and without any packets missing. The TCP also has the capability to distinguish data for different applications, such as, for example, a Web server and an email server, on the same computer.

Accordingly, the TCP protocol is frequently used with Internet communications. The traditional solution for implementing the OSI stack and TCP/IP processing may have been to use faster, more powerful processors. For example, research has shown that the common path for TCP input/output processing costs about 300 instructions. At the maximum rate, about 15 million (M) minimum size packets are received per second for a 10 Gbits/connection. As a result, about 4,500 million instructions per second (MIPS) are required for input path processing. When a similar number of MIPS is added for processing an outgoing connection, the total number of instructions per second, which may be close to the limit of a modern processor. For example, an advanced Pentium 4 processor may deliver about 10,000 MIPS of processing power. However, in a design where the processor may handle the entire protocol stack, the processor may become a bottleneck.

Existing designs for host bus adaptors or network interface cards (NIC) have relied heavily on running firmware on embedded processors. These designs share a common characteristic that they all rely on embedded processors and firmware to handle network stack processing at the NIC level. To scale with ever increasing network speed, a natural solution for conventional NICs is to utilize more processors, which increases processing speed and cost of implementation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a system-on-a-chip (SoC) device with integrated support for Ethernet, TCP, iSCSI, RDMA, and network application acceleration, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing network data utilizing a system-on-a-chip (SoC) device with integrated support for Ethernet, TCP, iSCSI, RDMA, and network application acceleration. The SoC device may comprise a multifunction host bus adapter (MHBA) chip, which may be adapted to handle a plurality of protocols. The MHBA chip may store received data for at least one of a plurality of network connections, and the MHBA chip may be configured to process the received data based on one of the plurality of protocols that is associated with the received data. For example, the MHBA chip may be adapted to handle data associated with one of a plurality of protocols, such as an Ethernet protocol, a transmission control protocol (TCP), an Internet protocol (IP), an Internet small computer system interface (iSCSI) protocol, and a remote direct memory access (RDMA) protocol. In this regard, data processing associated with such protocols may be offloaded to the MHBA chip from a host processor, thereby increasing the efficiency of the host processor and significantly reducing costs of implementation.

Figure 1A:
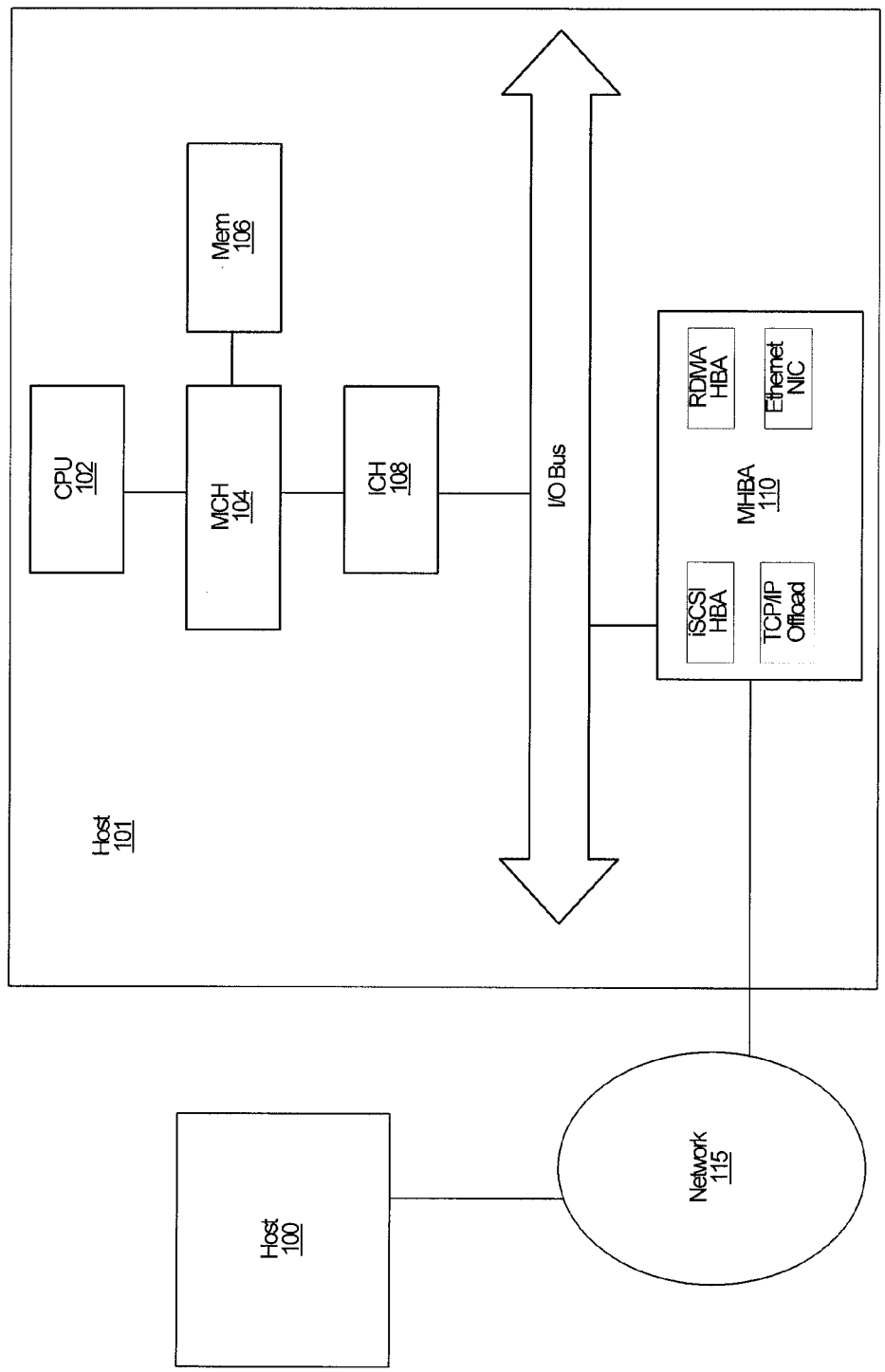
FIG. 1A is a block diagram of an exemplary communication system, which may be utilized in connection with an embodiment of the invention.

FIG. 1A is a block diagram of an exemplary communication system, which may be utilized in connection with an embodiment of the invention. Referring to FIG. 1A, there is shown hosts 100 and 101, and a network 115. The host 101 may comprise a central processing unit (CPU) 102, a memory interface (MCH) 104, a memory block 106, an input/output (IO) interface (ICH) 108, and a multifunction host bus adapter (MHBA) chip 110.

The memory interface (MCH) 104 may comprise suitable circuitry and/or logic that may be adapted to transfer data between the memory block 106 and other devices, for example, the CPU 102. The input/output interface (ICH) 108 may comprise suitable circuitry and/or logic that may be adapted to transfer data between IO devices, between an IO device and the memory block 106, or between an IO device and the CPU 102. The MHBA 110 may comprise suitable circuitry, logic and/or code that may be adapted to transmit and receive data for any of a plurality of communication protocols. The MHBA chip 110 may utilize RDMA host bus adapter (HBA) functionalities, iSCSI HBA functionalities, Ethernet network interface card (NIC) functionalities, and/or TCP/IP offload functionalities. In this regard, the MHBA chip 110 may be adapted to process Ethernet protocol data, TCP data, IP data, iSCSI data and RDMA data. The amount of processing may be design and/or implementation dependent. In some instances, the MHBA chip 110 may comprise a single chip that may use on-chip memory and/or off-chip memory for processing data for any of the plurality of communication protocols.

In operation, the host 100 and the host 101 may communicate with each other via, for example, the network 115. The network 115 may be an Ethernet network. Accordingly, the host 100 and/or 101 may send and/or receive packets via a network interface card, for example, the MHBA chip 110. For example, the CPU 102 may fetch instructions from the memory block 106 and execute those instructions. The CPU 102 may additionally store within, and/or retrieve data from, the memory block 106. Execution of instructions may comprise transferring data with other components. For example, a software application running on the CPU 102 may have data to transmit to a network, for example, the network 115. An example of the software application may be email applications that are used to sent email sent between the hosts 100 and 101.

Accordingly, the CPU 102 in the host 101 may process data in an email and communicate the processed data to the MHBA chip 110. The data may be communicated to the MHBA chip 110 directly by the CPU 102. Alternatively, the data may be stored in the memory block 106. The stored data may be transferred to the MHBA chip 110 via, for example, a direct memory access (DMA) process. Various parameters needed for the DMA, for example, the source start address, the number of bytes to be transferred, and the destination start address, may be written by the CPU 102 to, for example, memory interface (MCH) 104. Upon a start command, the memory interface (MCH) 104 may start the DMA process. In this regard, the memory interface (MCH) 104 may act as a DMA controller.

The NIC of the MHBA chip 110 may further process the email data and transmit the email data as packets in a format suitable for transfer over the network 115 to which it is connected. Similarly, the NIC of the MHBA chip 110 may receive packets from the network 115 to which it is connected. The NIC of the MHBA chip 110 may process data in the received packets and communicate the processed data to higher protocol processes that may further process the data. The processed data may be stored in the memory block 106, via the IO interface (ICH) 108 and the memory interface (MCH) 104. The data in the memory block 106 may be further processed by the email application running on the CPU 102 and finally displayed as a, for example, text email message for a user on the host 101.

Figure 1B:
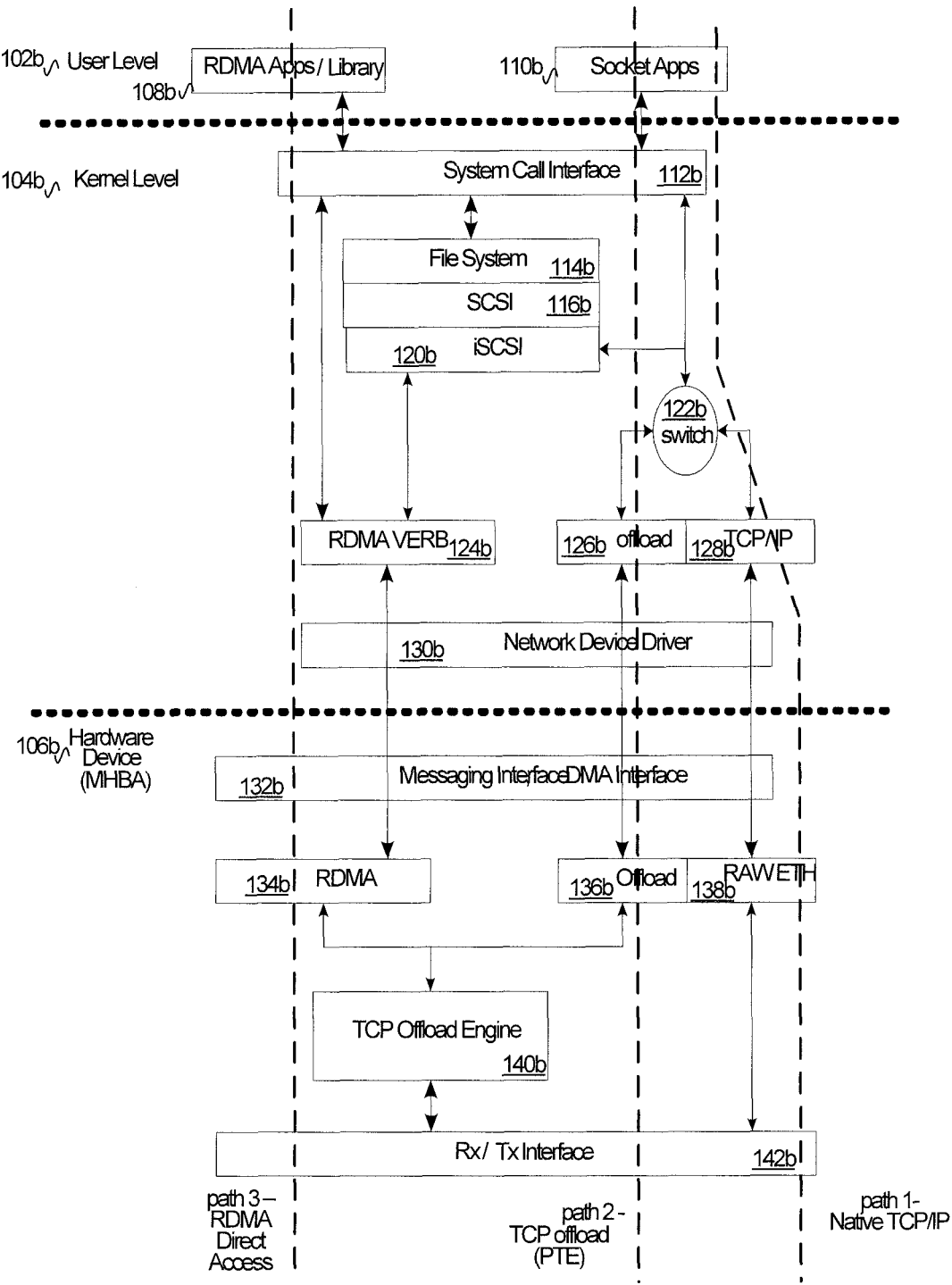
FIG. 1B is a block diagram illustrating various processing paths for a multifunction host bus adapter, in accordance with an embodiment of the invention.

FIG. 1B is a block diagram illustrating various processing paths for a multifunction host bus adapter, in accordance with an embodiment of the invention. Referring to FIG. 1B, there is illustrated a hardware device integrated within a chip, such as a multifunction host bus adapter (MHBA) chip 106b, which may be utilized to process data from one or more connections with the application or user level 102b. The user level may communicate with the MHBA chip 106b via the kernel or software level 104b. The user level 102b may utilize one or more RDMA applications 108b and/or socket applications 110b. The kernel level 104b may utilize software, for example, which may be used to implement a system call interface 112b, file system processing 114b, small computer system interface processing (SCSI) 116b, Internet SCSI processing (iSCSI) 120b, RDMA verb library processing 124b, TCP offload processing 126b, TCP/IP processing 128b, and network device drivers 130b. The MHBA 106b may comprise messaging and DMA interface (IF) 132b, RDMA processing block 134b, TCP offload processing block 136b, Ethernet processing block 138b, a TCP offload engine 140b, and a transceiver (Tx/Rx) interface 142b.

In one embodiment of the invention, the MHBA chip 106b may be adapted to process data from a native TCP/IP or Ethernet stack, a TCP offload stack, and/or an RDMA stack. The Ethernet stack processing, the TCP offload processing, and the RDMA processing may be represented with path 1, 2, and 3 in FIG. 1B, respectively.

The Ethernet processing path, path 1, may be utilized by existing socket applications 110b for performing network input/output (I/O) operations. During Ethernet packet processing, a packet may be communicated from the socket application 110b to the TCP/IP processing block 128b within the kernel level 104b via the system call interface 112b and the switch 122b. The TCP/IP processing block 128b may then communicate the Ethernet packet to the Ethernet processing block 138b within the MHBA chip 106b. After the Ethernet packet is processed, the result may be communicated to the Rx/Tx interface (IF) 142b. In one embodiment of the invention, the MHBA chip 106b may utilize optimization technology to perform data optimization operations, for example, within the raw Ethernet path, path 1. Such data optimization operations may include calculation of IP header checksum, TCP checksum and/or user datagram protocol (UDP) checksum. Additional data optimization operations may comprise calculation of application specific digests, such as the 32-bits cyclic redundancy check (CRC-32) values for iSCSI. Other optimization operations may comprise adding a secure checksum to remote procedure call (RPC) calls and replies.

During an exemplary TCP offload processing scenario as illustrated by path 2, a TCP packet may be communicated from the socket application 110b to the TCP offload processing block 126b within the kernel level 104b via the system call interface 112b and the switch 122b. The TCP offload processing block 126b may then communicate the TCP packet to the TCP offload block 136b, which may communicate the TCP packet to the TCP offload engine 140b for processing. After the TCP packet is processed, the result may be communicated from the TCP offload engine 140b to the Rx/Tx interface (IF) 142b. The Rx/Tx IF 142b may be adapted to communicate information to and from the MHBA chip 106b. The TCP offload engine (TOE) 140b within the MHBA chip 106b may be adapted to handle network I/O processing with limited or no involvement from a host processor. Specifically, the TOE 140b may be adapted to perform protocol-related encapsulation, segmentation, re-assembly, and/or acknowledgement tasks within the MHBA chip 106b, thereby reducing overhead on the host processor.

During an exemplary RDMA stack processing scenario as illustrated by path 3, an RDMA packet may be communicated from the RDMA application block 108b within the user level 102b to the RDMA processing block 134b within the MHBA chip 106b via one or more blocks within the kernel level 104b. For example, an RDMA packet may be communicated from the RDMA application block 108b to the RDMA verb processing block 124b via the system call interface 112b. The RDMA verb processing block 124b may communicate the RDMA packet to the RDMA processing block 134b by utilizing the network device driver 130b and the messaging interface 132b. The RDMA processing block 134b may utilize the TCP offload engine 140b for further processing of the RDMA packet. After the RDMA packet is processed, the result may be communicated from the TCP offload engine 140b to the Rx/Tx interface (IF) 142b.

Figure 2:
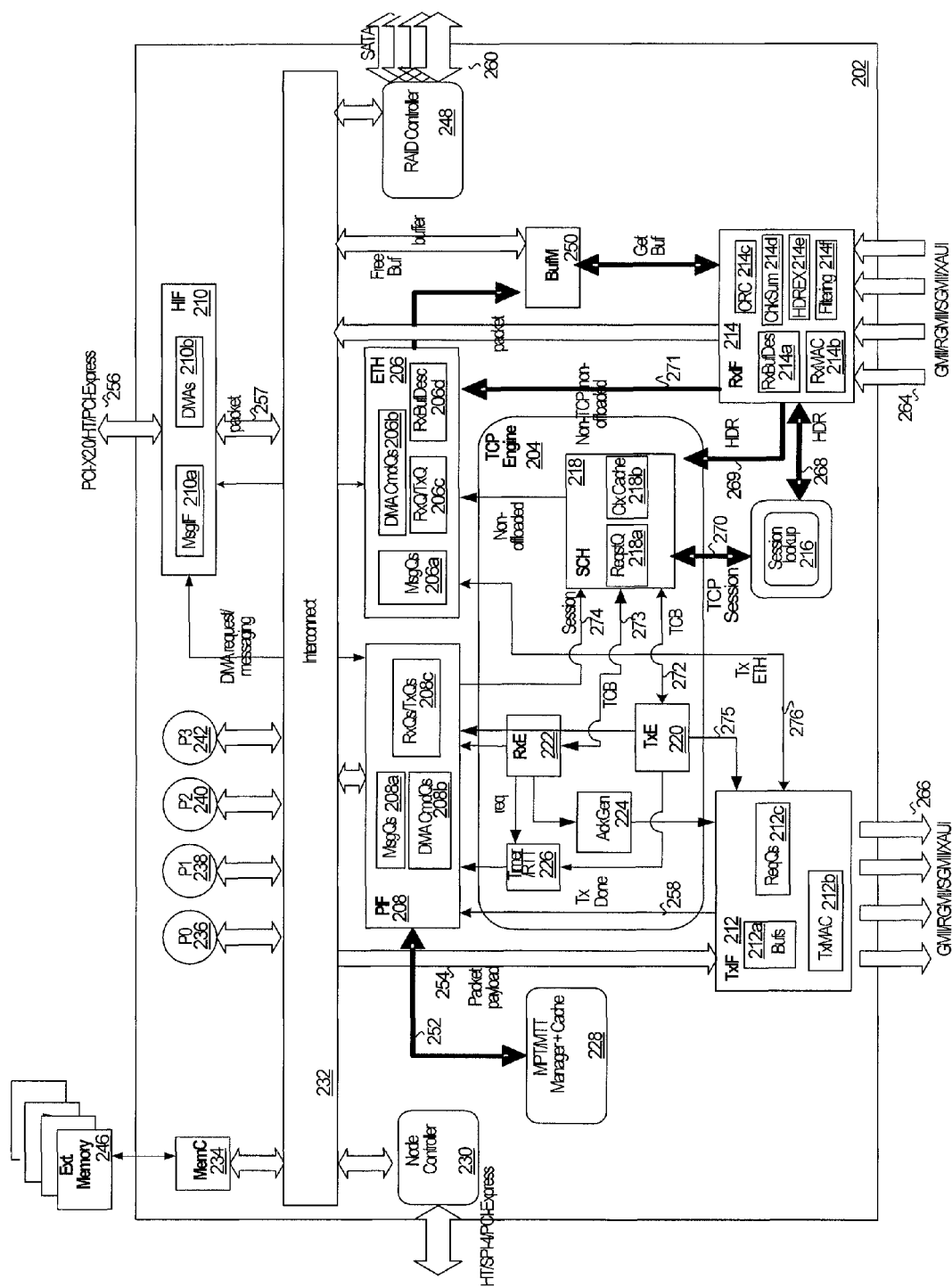
FIG. 2 is a block diagram of an exemplary multifunction host bus adapter chip, in accordance with an embodiment of the invention.

FIG. 2 is a block diagram of an exemplary multifunction host bus adapter chip, in accordance with an embodiment of the invention. Referring to FIG. 2, the multifunction host bus adapter (MHBA) chip 202 may comprise a receive interface (RxIF) 214, a transmit interface (TxIF) 212, a TCP engine 204, processor interface (PIF) 208, Ethernet engine (ETH) 206, host interface (HIF) 210, and protocol processors 236, . . . , 242. The MHBA chip 202 may further comprise a session lookup block 216, MPT/MTT processing block 228, node controller 230, a redundant array of inexpensive disks (RAID) controller 248, a memory controller 234, a buffer manager 250, and an interconnect bus 232.

The RxIF 214 may comprise suitable circuitry, logic, and/or code and may be adapted to receive data from any of a plurality of protocol types, to pre-process the received data and to communicate the pre-processed data to one or more blocks within the MHBA chip 202 for further processing. The RxIF 214 may comprise a receive buffer descriptor queue 214a, a receiver media access control (MAC) block 214b, a cyclic redundancy check (CRC) block 214c, checksum calculation block 214d, header extraction block 214e, and filtering block 214f. The RxIF 214 may receive packets via one or more input GMII/RGMII/SGMII/XAUI ports 264. The input GMII/RGMII/SGMII/XAUI ports 264 may each have a unique IP address and may be adapted to support Gigabit Ethernet, for example. The receive buffer descriptor queue 214a may comprise a list of local buffers for keeping received packets. This list may be received from the buffer manager 250. The receiver MAC block 214b may comprise suitable circuitry, logic, and/or code and may be utilized to perform media access control (MAC) layer processing, such as checksum validation, of a received packet.

The receiver MAC block 214b may utilize the checksum calculation block 214d to calculate a checksum and compare the calculated checksum with that of a received packet. Corrupted packets with incorrect checksums may be discarded by the RxIF 214. Furthermore, the receiver MAC block 214b may utilize the filtering block 214f to filter out the frames intended for the host by verifying the destination address in the received frames. In this regard, the receiver MAC block 214b may compare an IP address of a current packet with a destination IP address. If the IP addresses do not match, the packet may be dropped. The RxIF 214 may utilize the CRC block 214c to calculate a CRC for a received packet. In addition, the RxIF 214 may utilize the header extraction block 214e to extract one or more headers from a received packet. For example, the RxIF 214 may initially extract an IP header and then a TCP header.

The transmit interface (TxIF) 212 may comprise suitable circuitry, logic, and/or code and may be adapted to buffer processed data and perform MAC layer functions prior to transmitting the processed data outside the MHBA chip 202. Furthermore, the TxIF 212 may be adapted to calculate checksums and/or cyclic redundancy checks (CRCs) for outgoing packets, as well as to insert MPA markers within RDMA packets. Processed data may be transmitted by the TxIF 212 via one or more output ports 266, which may support Gigabit Ethernet, for example. The TxIF 212 may comprise a plurality of buffers 212a, one or more request queues 212c, and a transmit (Tx) MAC block 212b. Request commands for transmitting processed data may be queued in the request queue 212c. Processed data may be stored by the TxIF 212 within one or more buffers 212a. In one embodiment of the invention, when data is stored into the buffers 212a via, for example, a DMA transfer, the TxIF 212 may calculate checksum for a transmit packet.

The TCP engine 204 may comprise suitable circuitry, logic, and/or code and may be adapted to process TCP offload packets. The TCP engine may comprise a scheduler 218, a TCP receive engine (RxE) 222, a TCP transmit engine (TxE) 220, a timer 226, and an acknowledgement generator 224. The scheduler 218 may comprise a request queue 218a and context cache 218b. The context cache 218b may store transmission control block (TCB) array information for the most recently accessed TCP sessions.

The scheduler 218 may be adapted to accept packet information, such as TCP header information from the RxIF 214 and to provide transmission control blocks (TCBs), or TCP context to the RxE 222 during processing of a received TCP packet, and to the TxE 220 during transmission of a TCP offload packet. The TCB information may be acquired from the context cache 218*b*, based on a result of the TCP session lookup 216. The request queue 218*a* may be utilized to queue one or more requests for TCB data from the context cache 218*b*. The scheduler 218 may also be adapted to forward received TCP packets to the Ethernet engine (ETH) 206 if context for offload sessions cannot be found.

The session lookup block 216 may comprise suitable circuitry, logic, and/or code and may be utilized by the scheduler 218 during a TCP session lookup operation to obtain TCP context information from the context cache 218*b*, based on TCP header information received from the RxIF 214.

The RxE 222 may comprise suitable circuitry, logic, and/or code and may be an RFC-compliant hardware engine that is adapted to process TCP packet header information for a received packet. The TCP packet header information may be received from the scheduler 218. Processed packet header information may be communicated to the PIF 208 and updated TCP context information may be communicated back to the scheduler 218 for storage into the context cache 218*b*. The RxE 222 may also be adapted to generate a request for the timer 226 to set or reset a timer as well as a request for calculation of a round trip time (RTT) for processing TCP retransmissions and congestion avoidance. Furthermore, the RxE 222 may be adapted to generate a request for the acknowledgement generator 224 to generate one or more TCP acknowledgement packets.

The TxE 220 may comprise suitable circuitry, logic, and/or code and may be an RFC-compliant hardware engine that is adapted to process TCP context information for a transmit packet. The TxE 220 may receive the TCP context information from the scheduler 218 and may utilize the received TCP context information to generate a TCP header for the transmit packet. The generated TCP header information may be communicated to the TxIF 212, where the TCP header may be added to TCP payload data to generate a TCP transmit packet.

The processor interface (PIF) 208 may comprise suitable circuitry, logic, and/or code and may utilize embedded processor cores, such as the protocol processors 236, . . . , 242, for handling dynamic operations such as TCP re-assembly and host messaging functionalities. The PIF 208 may comprise a message queue 208*a*, a direct memory access (DMA) command queue 208*b*, and receive/transmit queues (RxQ/TxQ) 208*c*. The protocol processors 236, . . . , 242 may be used for TCP re-assembly and system management tasks.

The Ethernet engine (ETH) 206 may comprise suitable circuitry, logic, and/or code and may be adapted to handle processing of non-offloaded packets, such as Ethernet packets or TCP packets that may not require TCP session processing. The ETH 206 may comprise message queues 206*a*, DMA command queues 206*b*, RxQ/TxQ 206*c*, and receive buffer descriptor list 206*d*.

The host interface (HIF) 210 may comprise suitable circuitry, logic, and/or code and may provide messaging support for communication between a host and the MHBA chip 202 via the PCI-X2.0/HT/PCI-Express connection 256. The MPT/MTT processing block 228 may comprise suitable circuitry, logic, and/or code and may be utilized for real host memory address lookup during processing of an RDMA connection. The MPT/MTT processing block 228 may comprise adaptive cache for caching MPT and MTT entries during a host memory address lookup operation. An exemplary adaptive cache design for MPT/MTT tables and TCP context is described in U.S. patent application Ser. No. 11/228,362 filed Sep. 16, 2005, which is incorporated herein by reference in its entirety.

The buffer manager 250 may comprise suitable circuitry, logic, and/or code and may be utilized to manage local buffers within the MHBA chip 202. The buffer manager 250 may provide buffers to, for example, the RxIF 214 for receiving unsolicited packets. The buffer manager 250 may also accept buffers released by logic blocks such as the ETH 206, after, for example, the ETH 206 has completed a DMA operation that moves received packets to host memory.

The MHBA chip 202 may also utilize a node controller 230 to communicate with outside MHBAs so that multiple MHBA chips may form a multiprocessor system. The RAID controller 248 may be used by the MHBA chip 202 for communication with an outside storage device. The memory controller 234 may be used to control communication between the external memory 246 and the MHBA chip 202. The external memory 246 may be utilized to store a main TCB array, for example. A portion of the TCB array may be communicated to the MHBA chip 202 and may be stored within the context cache 218*b*.

In operation, a packet may be received by the RxIF 214 via an input GMII/RGMII/SGMII/XAUI port 264 and may be processed within the MHBA chip 202, based on a protocol type associated with the received data. The RxIF 214 may drop packets with incorrect destination addresses or corrupted packets with incorrect checksums. A buffer may be obtained from the descriptor list 214*a* for storing the received packet and the buffer descriptor list 214*a* may be updated. A new replenishment buffer may be obtained from the buffer manager 250. If the received packet is a non-TCP packet, such as an Ethernet packet, the packet may be delivered to the ETH 206 via the connection 271. Non-TCP packets may be delivered to the ETH 206 as Ethernet frames. The ETH 206 may also receive non-offloaded TCP packets from the scheduler 218 within the TCP engine 204. After the ETH 206 processes the non-TCP packet, the processed packet may be communicated to the HIF 210. The HIF 210 may communicate the received processed packet to the host via the PCI-X2.0/HT/PCI-Express connection 256.

If the received packet is a TCP offload packet, the received packet may be processed by the RxIF 214. The RxIF 214 may remove the TCP header which may be communicated to the scheduler 218 within the TCP engine 204 and to the session lookup block 216. The resulting TCP payload may be communicated to the external memory 246 via the interconnect bus 232, for processing by the protocol processors 236, . . . , 242. The scheduler 218 may utilize the session lookup block 216 to perform a TCP session lookup from recently accessed TCP sessions, based on the received TCP header. The selected TCP session 270 may be communicated to the scheduler 218. The scheduler 218 may select TCP context for the current TCP header, based on the selected TCP session 270 information. The TCP context may be communicated to the RxE 222 via connection 273. The RxE 222 may process the current TCP header and extract control information, based on the selected TCP context or TCB received from the scheduler 218. The RxE 222 may then update the TCP context based on the processed header information and the updated TCP context may be communicated back to the scheduler 218 for storage into the context cache 218*b*. The processed header information may be communicated from the RxE 222 to the PIF 208. The protocol processors 236, . . . , 242 may then perform TCP re-assembly. The re-assembled TCP packets, with payload data read out of external memory 246, may be communicated to the HIF 210 and then to a host via the PCI-X2.0/HT/PCI-Express connection 256.

During processing of data for transmission, data may be received by the MHBA chip 202 from the host via the PCI-X2.0/HT/PCI-Express connection 256 and the HIF 210. The received transmit data may be stored within the external memory 246. If the transmit data is a non-TCP data, it may be communicated to the ETH 206. The ETH 206 may process the non-TCP packet and may communicate the processed packet to the TxIF 212 via connection 276. The TxIF 212 may then communicate the processed transmit non-TCP packet outside the MHBA chip 202 via the output ports 266.

If the transmit data comprises TCP payload data, the PIF 208 may communicate a TCP session indicator corresponding to the TCP payload information to the scheduler 218 via connection 274. The scheduler 218 may select a TCP context from the context cache 218b, based on the TCP session information received from the PIF 208. The selected TCP context may be communicated from the scheduler 218 to the TxE 220 via connection 272. The TxE 220 may then generate a TCP header for the TCP transmit packet, based on the TCB or TCP context received from the scheduler 218. The generated TCP header may be communicated from the TxE 220 to the TxIF 212 via connection 275. The TCP payload may be communicated to the TxIF 212 from the PIF 208 via connection 254. The packet payload may also be communicated from the host to the TxIF 212, or from the host to local buffers within the external memory 246. In this regard, during packet re-transmission, data may be communicated to the TxIF 212 via a DMA transfer from a local buffer in the external memory 246 or via DMA transfer from the host memory. The TxIF 212 may utilize the TCP payload received from the PIF 208 and the TCP header received from the TxE 220 to generate a TCP packet. The generated TCP packet may then be communicated outside the MHBA chip 202 via one or more output ports 266.

In an exemplary embodiment of the invention, the MHBA chip 202 may be adapted to process RDMA data received by the RxIF 214, or RDMA data for transmission by the TxIF 212. Processing of RDMA data by an exemplary host bus adapter such as the MHBA chip 202 is further described below, with reference to FIGS. 3A and 3B. RDMA is a technology for achieving zero-copy in modern network subsystem. It is a suite that may comprise three protocols—RDMA protocol (RDMAP), direct data placement (DDP), and marker PDU aligned framing protocol (MPA), where a PDU is a protocol data unit. RDMAP may provide interfaces to applications for sending and receiving data. DDP may be utilized to slice outgoing data into segments that fit into TCP's maximum segment size (MSS) field, and to place incoming data into destination buffers. MPA may be utilized to provide a framing scheme which may facilitate DDP operations in identifying DDP segments during RDMA processing. RDMA may be a transport protocol suite on top of TCP.

Figure 3A:
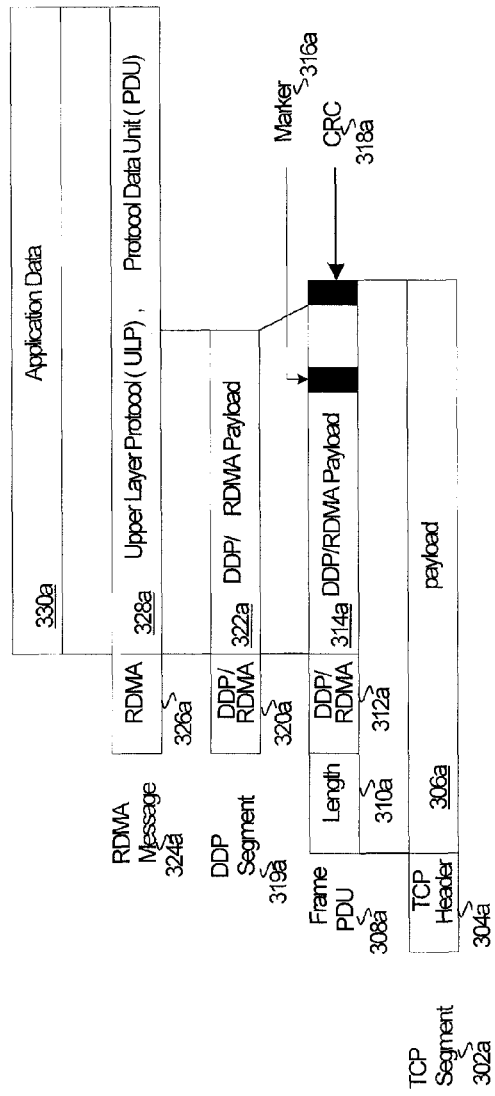
FIG. 3A is a diagram illustrating RDMA segmentation, in accordance with an embodiment of the invention.

FIG. 3A is a diagram illustrating RDMA segmentation, in accordance with an embodiment of the invention. Referring to FIGS. 2 and 3A, the MHBA chip 202 may be adapted to process an RDMA message received by the RxIF 214. For example, the RxIF 214 may receive a TCP segment 302a. The TCP segment may comprise a TCP header 304a and payload 306a. The TCP header 304a may be separated by the RxIF 214, and the resulting header 306a may be communicated and buffered within the PIF 208 for processing by the protocol processors 236, ..., 242. Since an RDMA message may be sufficiently large to fit into one TCP segment, DDP processing by the processors 236, ..., 242 may be utilized for slicing a large RDMA message into smaller segments. For example, the RDMA protocol data unit 308a, which may be part of the payload 306a, may comprise a combined header 310a and 312a, and a DDP/RDMA payload 314a. The combined header may comprise control information such as an MPA head, which comprises length indicator 310a and a DDP/RDMA header 312a. The DDP/RDMA header information 312a may specify parameters such as operation type, the address for the destination buffers and the length of data transfer.

A marker may be added to an RDMA payload by the MPA framing protocol at a stride of every 512 bytes in the TCP sequence space. Markers may assist a receiver, such as the MHBA chip 202, to locate the DDP/RDMA header 312a. If the MHBA chip 202 receives network packets out-of-order, the MHBA chip 202 may utilize the marker 316a at fixed, known locations to quickly locate DDP headers, such as the DDP/RDMA header 312a. After recovering the DDP header 312a, the MHBA chip 202 may place data into a destination buffer within the host memory via the HIF 210. Because each DDP segment is self-contained and the RDMA header 312a may include destination buffer address, quick data placement in the presence of out-of-order packets may be achieved.

The HIF 210 may be adapted to remove the marker 316a and the CRC 318a to obtain the DDP segment 319a. The DDP segment 319a may comprise a DDP/RDMA header 320a and a DDP/RDMA payload 322a. The HIF 210 may further process the DDP segment 319a to obtain the RDMA message 324a. The RDMA message 324a may comprise an RDMA header 326a and payload 328. The payload 328, which may be the application data 330a, may comprise upper layer protocol (UPL) information and protocol data unit (PDU) information.

Figure 3B:
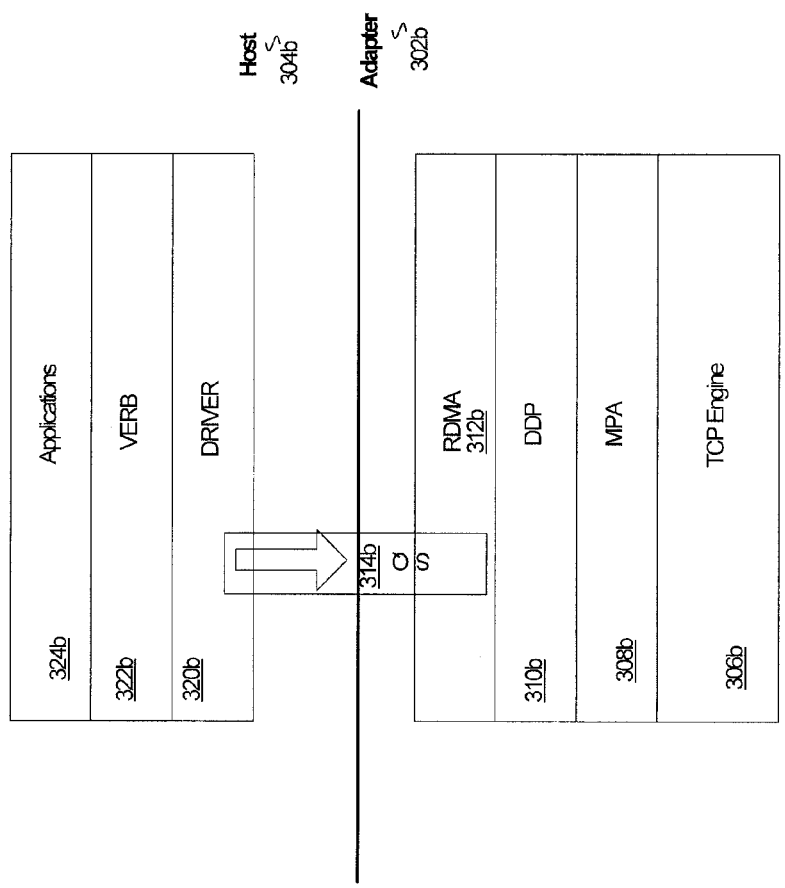
FIG. 3B is a diagram illustrating RDMA processing, in accordance with an embodiment of the invention.

FIG. 3B is a diagram illustrating RDMA processing, in accordance with an embodiment of the invention. Referring to FIGS. 2 and 3A, a host bus adapter 302b, which may be the same as the MHBA chip 202 in FIG. 2, may utilize RDMA protocol processing block 312b, DDP processing 310b, MPA processing 308b, and TCP processing by a TCP engine 306b. RDMA, MPA and DDP processing may be performed by the processors 236, ..., 242. A host application 324b within the host 304b may communicate with the MHBA 202 via a verb layer 322b and driver layer 320b. The host application 324b may communicate data via a RDMA/TCP connection, for example. In such instances, the host application 324b may issue a transmit request to the send queue (SQ) 314b. The transmit request command may comprise an indication of the amount of data that is to be sent to the MHBA chip 202. When an RDMA packet is ready for transmission, MPA markers and CRC information may be calculated and inserted within the RDMA payload by the TxIF 212.

Figure 3C:
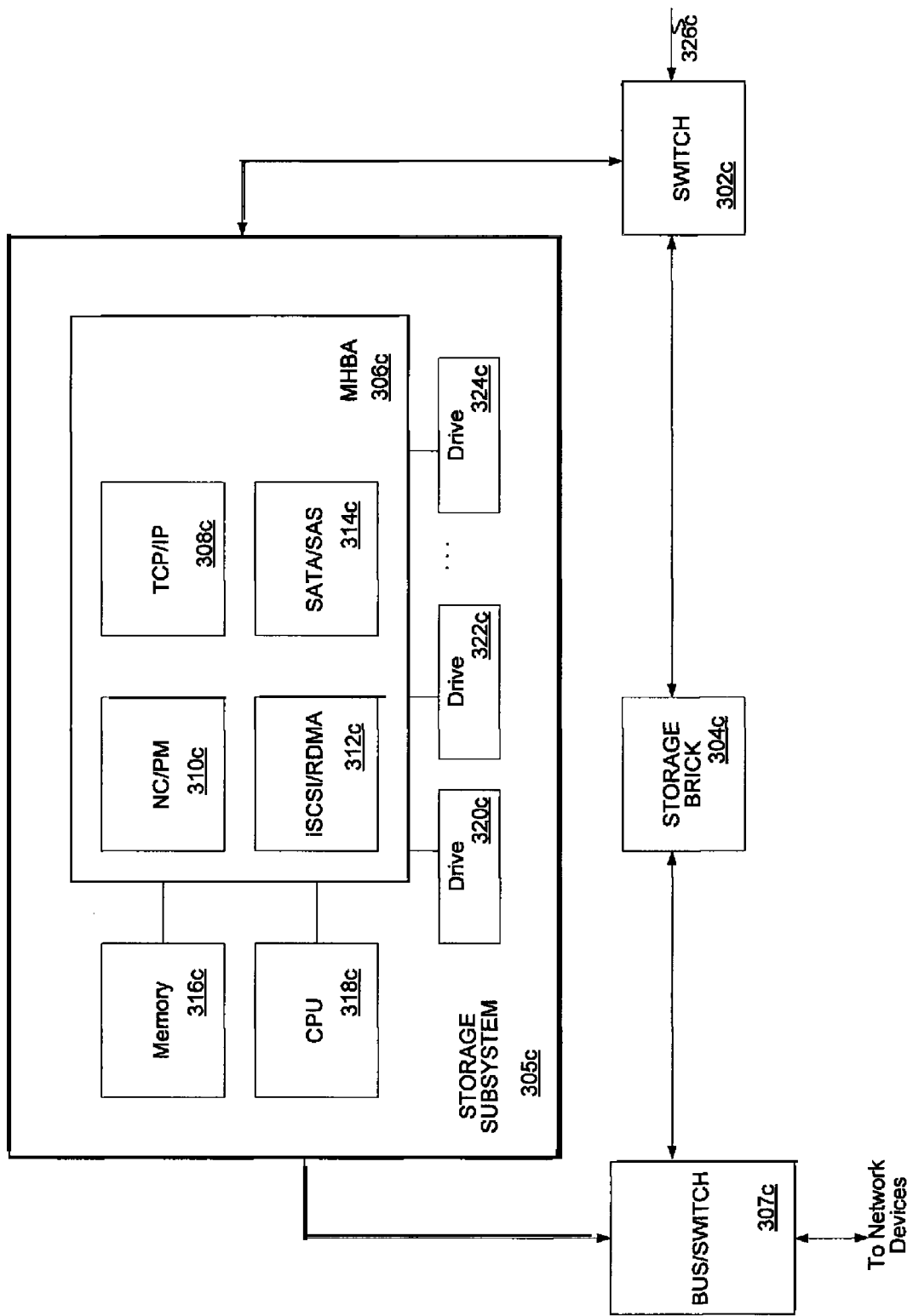
FIG. 3C is a block diagram of an exemplary storage subsystem utilizing a multifunction host bus adapter, in accordance with an embodiment of the invention.

FIG. 3C is a block diagram of an exemplary storage subsystem utilizing a multifunction host bus adapter, in accordance with an embodiment of the invention. Referring to FIG. 3C, the exemplary storage subsystem 305c may comprise memory 316c, a processor 318c, a multifunction host bus adapter (MHBA) chip 306c, and a plurality of storage drives 320c, ..., 324c. The MHBA chip 306c may be the same as MHBA chip 202 of FIG. 2. The MHBA chip 306c may comprise a node controller and packet manager (NC/PM) 310c, an iSCSI and RDMA (iSCSI/RDMA) block 312c, a TCP/IP processing block 308c and a serial advanced technology attachment (SATA) interface 314c. The storage subsystem 305c may be communicatively coupled to a bus/switch 307c and to a server switch 302c.

The NC/PM 310c may comprise suitable circuitry, logic, and/or code and may be adapted to control one or more nodes that may be utilizing the storage subsystem 305c. For example, a node may be connected to the storage subsystem 305c via the bus/switch 307c. The iSCSI/RDMA block 312c and the TCP/IP block 308c may be utilized by the storage subsystem 305c to communicate with a remote dedicated server, for example, using iSCSI protocol over a TCP/IP network. For example, network traffic 326c from a remote server may be communicated to the storage subsystem 305c via the switch 302c and over a TCP/IP connection utilizing the iSCSI/RDMA block 312c. In addition, the iSCSI/RDMA block 312c may be utilized by the storage subsystem 305c during an RDMA connection between the memory 316c and a memory in a remote device, such as a network device coupled to the bus/switch 307c. The SATA interface 314c may be utilized by the MHBA chip 306c to establish fast connections and data exchange between the MHBA chip 306c and the storage drives 320c, . . . , 324c within the storage subsystem 305c.

In operation, a network device coupled to the bus/switch 307c may request storage of server data 326c in a storage subsystem. Server data 326c may be communicated and routed to a storage subsystem by the switch 302c. For example, the server data 326c may be routed for storage by a storage subsystem within the storage brick 304c, or it may be routed for storage by the storage subsystem 305c. The MHBA chip 306c may utilize the SATA interface 314c to store the acquired server data in any one of the storage drives 320c, . . . , 324c.

Figure 3D:
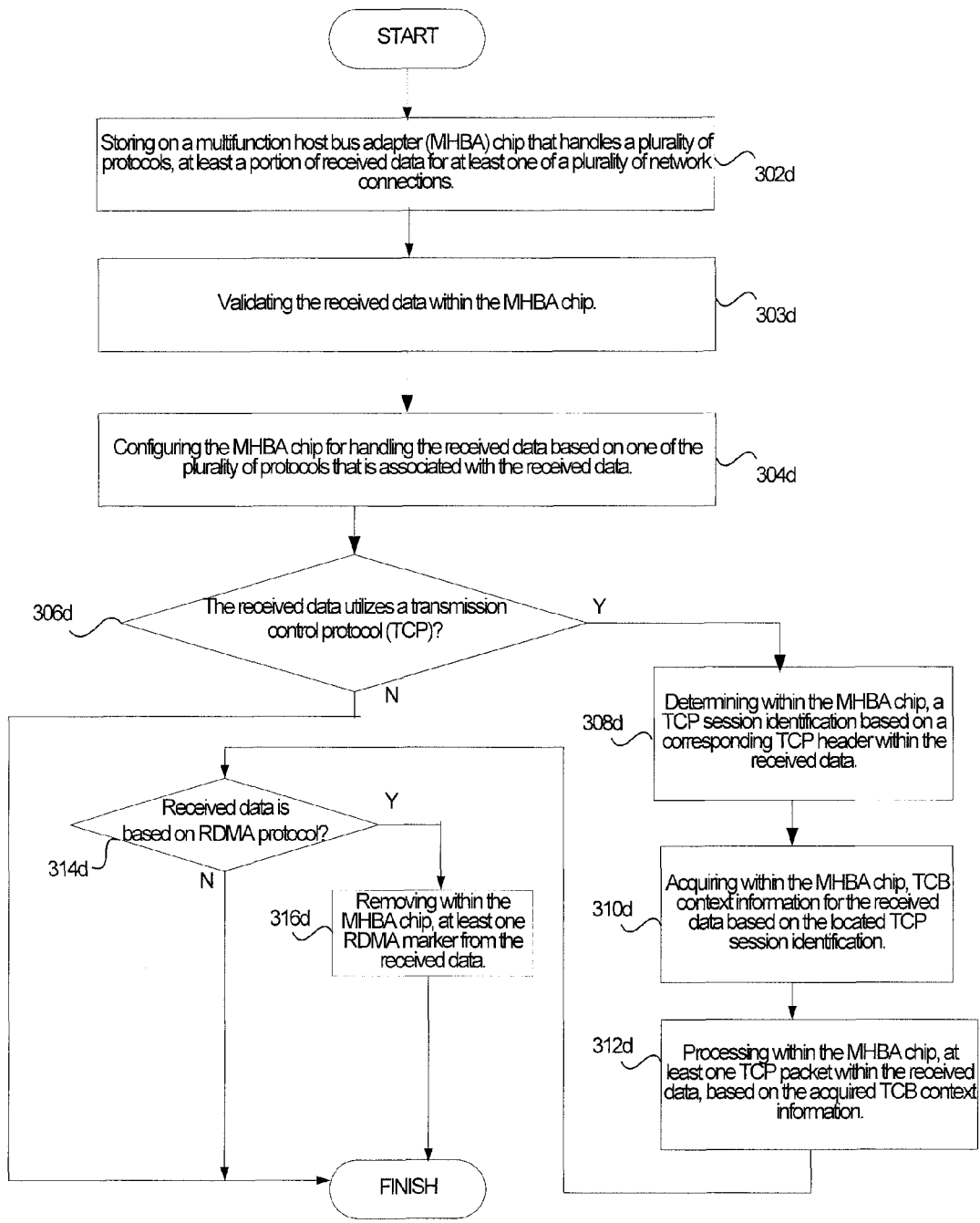
FIG. 3D is a flow diagram of exemplary steps for processing network data, in accordance with an embodiment of the invention.

FIG. 3D is a flow diagram of exemplary steps for processing network data, in accordance with an embodiment of the invention. Referring to FIGS. 2 and 3D, at 302d, at least a portion of received data for at least one of a plurality of network connections may be stored on a multifunction host bus adapter (MHBA) chip 202 that handles a plurality of protocols. At 303d, the received data may be validated within the MHBA chip 202. For example, the received data may be validated by the RxIF 214. At 304d, the MHBA chip 202 may be configured for handling the received data based on one of the plurality of protocols that is associated with the received data. At 306d, it may be determined whether the received data utilizes a transmission control protocol (TCP). If the received data utilizes a transmission control protocol, at 308d, a TCP session indication may be determined within the MHBA chip 202.

The TCP session indication may be determined by the session lookup block 216, for example, and the TCP session identification may be based on a corresponding TCP header within the received data. At 310d, TCP context information for the received data may be acquired within the MHBA chip 202, based on the located TCP session identification. At 312d, at least one TCP packet within the received data may be processed within the MHBA chip 202, based on the acquired TCP context information. At 314d, it may be determined whether the received data is based on a RDMA protocol. If the received data is based on a RDMA protocol, at 316d, at least one RDMA marker may be removed from the received data within the MHBA chip.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data, the method comprising:
performing by one or more processors and/or circuits on a chip that handles a plurality of networking protocols:
receiving data for one or more network connections corresponding to one or more of said plurality of networking protocols;
configuring said chip for handling said received data based on whether said one or more of said plurality of networking protocols associated with said received data comprises transmission control protocol; and
processing said received data based on said configuration, the processing comprising:
when one or more of said plurality of networking protocols associated with said received data comprises transmission control protocol:
determining whether said received data complies with a remote direct memory access (RDMA) protocol; and
removing at least one RDMA marker from said received data when said received data complies with said RDMA protocol; and
wherein the processing is performed in a TCP offload engine configured to perform one or more protocol-related tasks selected from the group consisting of: encapsulation, segmentation, re-assembly, and acknowledgement.

2. A system for multi-functional network communication, the system comprising:
a chip for controlling network data according to a plurality of protocols, the chip comprising:
a host interface;
an Ethernet interface configured to receive data;
one or more processors for evaluating a header in the received data, wherein the one or more processors determine a context based on the header if the received data is associated with a transmission control protocol (TCP) session, and in response to determining that the received data is associated with a TCP session, the one or more processors transfer the received data into a host memory buffer via the host interface if the received data is associated with a remote direct memory access (RDMA) protocol session; and
wherein the one or more processors comprise a TCP offload engine configured to perform one or more protocol-related tasks selected from the group consisting of: encapsulation, segmentation, re-assembly, and acknowledgement.

3. The system according to claim 2, wherein the chip is an integrated circuit.

4. The system according to claim 2, wherein the plurality of protocols comprise an Internet small computer system interface (iSCSI) protocol.

5. The system according to claim 2, wherein the system comprises an on-chip memory for temporarily storing at least a portion of the received data.

6. The system according to claim 2, wherein the host interface is a PCI-Express host interface.

7. The system according to claim 2, wherein the Ethernet interface comprises a XAUI port.

8. The system according to claim 2, wherein the Ethernet interface performs receiver media access control.

9. The system according to claim 2, wherein the Ethernet interface is configured to transmit data over Ethernet.

10. The system according to claim 2, wherein the Ethernet interface performs transmitter media access control.

11. The system according to claim 10, wherein the Ethernet interface comprises an RGMII port.

12. The system according to claim 2, wherein the one or more processors comprise a TCP receive engine for receiving an input from the Ethernet interface.

13. The system according to claim 2, wherein the one or more processors comprise a TCP transmit engine for sending an output to the Ethernet interface.

14. The system according to claim 2, wherein the one or more processors operate on non-offloaded data that is transferred between the Ethernet interface and the host interface.

15. The system according to claim 2, wherein the one or more processors perform system management tasks.

16. A method for multi-functional network communication, the method comprising:
performing by one or more processors integrated in a single chip for controlling network data according to a plurality of protocols, the chip comprising a host interface and an Ethernet interface configured to receive data, the following:
evaluating a header in the received data;
determining a context based on the header if the received data is associated with a transmission control protocol (TCP) session;
in response to determining that the received data is associated with a TCP session, transferring the received data into a host memory buffer via the host interface if the received data is associated with a remote direct memory access (RDMA) protocol session; and
wherein the one or more processors comprise a TCP offload engine configured to perform one or more protocol-related tasks selected from the group consisting of: encapsulation, segmentation, re-assembly, and acknowledgement.

17. The method according to claim 16, wherein the chip is an integrated circuit.

18. The method according to claim 16, wherein the plurality of protocols comprise an Internet small computer system interface (iSCSI) protocol.

19. The method according to claim 16, wherein the chip comprises an on-chip memory for temporarily storing at least a portion of the received data.

20. The method according to claim 16, wherein the host interface is a PCI-Express host interface.

21. The method according to claim 16, wherein the Ethernet interface comprises a XAUI port.

22. The method according to claim 16, wherein the Ethernet interface performs receiver media access control.

23. The method according to claim 16, wherein the Ethernet interface is configured to transmit data over Ethernet.

24. The method according to claim 23, wherein the Ethernet interface performs transmitter media access control.

25. The method according to claim 24, wherein the Ethernet interface comprises an RGMII port.

26. The method according to claim 16, wherein the one or more processors comprise a TCP receive engine for receiving an input from the Ethernet interface.

27. The method according to claim 16, wherein the one or more processors comprise a TCP transmit engine for sending an output to the Ethernet interface.

28. The method according to claim 16, wherein the one or more processors operate on non-offloaded data that is transferred between the Ethernet interface and the host interface.

29. The method according to claim 16, wherein the one or more processors perform system management tasks.

30. The method according to claim 16, further comprising removing an RDMA marker in response to determining that the received data is associated with the RDMA protocol session.

31. The system according to claim 2, wherein the one or more processors are further configured to remove an RDMA marker in response to determining that the received data is associated with the RDMA protocol session.

32. The method according to claim 1, further comprising transferring said received data into a host memory buffer when said received data comprises said RDMA protocol.

33. The method according to claim 1, wherein the receiving further comprises receiving the data by way of an Ethernet interface.

* * * * *